Sept. 5, 1944.　　　　J. F. HAINES　　　　2,357,400
PROPELLER CONTROL MECHANISM
Filed June 1, 1942　　　　2 Sheets-Sheet 1

INVENTOR
John F. Haines
BY
Spencer, Hardman & Fisher
ATTORNEYS

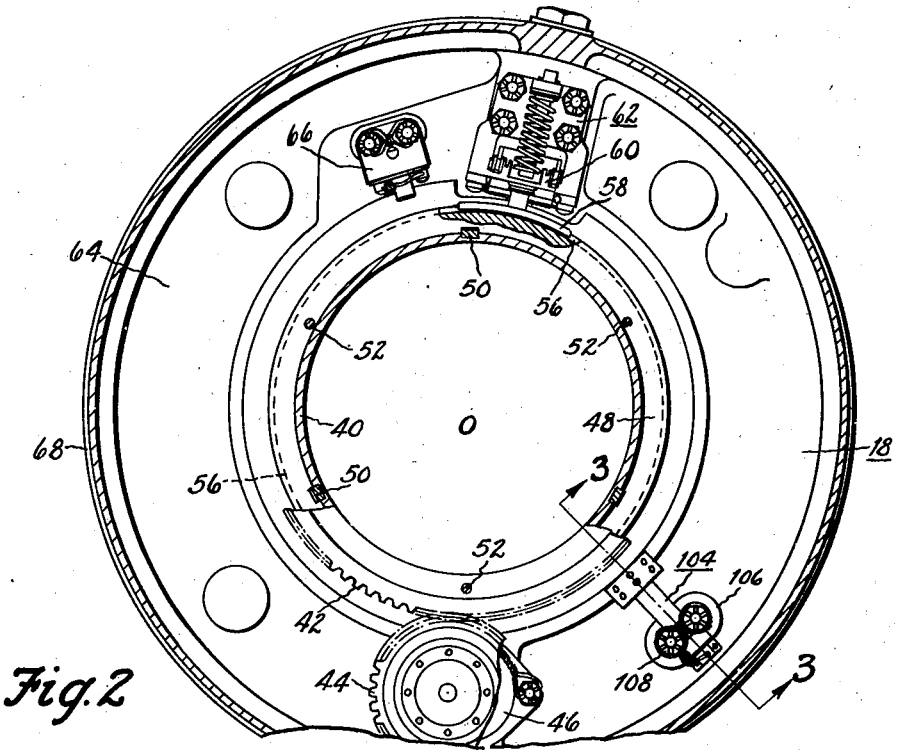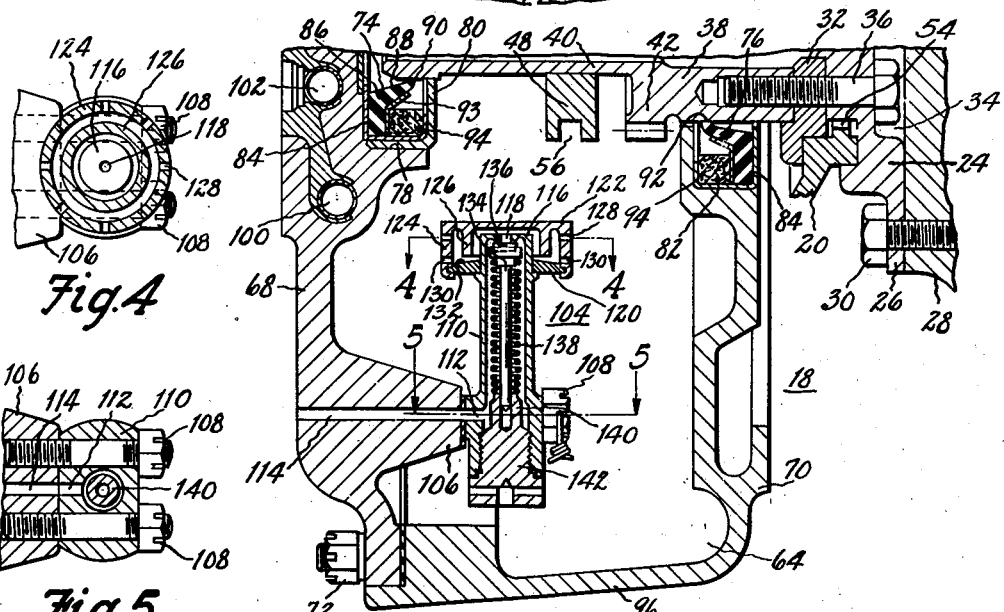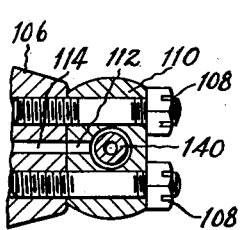

Patented Sept. 5, 1944

2,357,400

UNITED STATES PATENT OFFICE 2,357,400

PROPELLER CONTROL MECHANISM

John F. Haines, Dayton, Ohio, assignor to General Motors Corporation, Detroit, Mich., a corporation of Delaware Application June 1, 1942, Serial No. 445,367

15 Claims. (Cl. 170—163)

This invention relates to aircraft propellers of the variable pitch type and is principally concerned with those whose mechanisms are actuated by a hydraulic fluid.

One of the objects of the invention is to provide means for preventing the occurrence of substantial pressure differential between a fluid containing chamber and an outside atmosphere.

A further object of the invention is to provide means exposed to a rotating body of liquid medium for deareating the same.

A further object is to provide means in a hydraulically controlled propeller mechanism for preventing loss of a fluid pressure medium from within a rotating reservoir as the aircraft changes altitude.

Another object is to maintain a high degree of efficiency and accuracy of operation by a hydraulic control apparatus through minimizing of leakage of the liquid medium.

Another object is to maintain a high standard of accuracy of operation by keeping the volume of hydraulic fluid substantially constant while the apparatus is in operation.

Another object is to provide means for preventing loss of the hydraulic fluid while the apparatus is at rest.

Still another object is to provide a breather valve for a sealed rotating reservoir so that the internal and external pressures may be equalized during speeds of rotation above a predetermined speed of rotation, and so that the pressures both inside and outside of the reservoir may follow the same gradient as the craft equipped with the reservoir is subjected to varying external pressure conditions.

Further objects and advantages of the present invention will be apparent from the following description, reference being had to the accompanying drawings wherein a preferred embodiment of the present invention is clearly shown.

The foregoing objects are accomplished by providing a breather valve within the reservoir which breather valve responds to changes in speed of rotation for controlling a port from the reservoir to outside atmosphere.

The valve is so constituted as to be normally closed while the apparatus is in a condition of rest, but upon attainment of a predetermined speed of propeller rotation will open the port so as to permit a substantial equalization of pressure within and without the reservoir. Embodied in the breather valve construction in close proximity to the valve port there is provided a labyrinth or a series of baffles, and an inclined surface by means of which aerated hydraulic fluid will be centrifugated so as to separate the heavier particles of the hydraulic fluid from the air, before the enclosed air creating the greater moment of pressure will be allowed to escape.

In the drawings:

Fig. 2 is a transverse sectional view through the regulator housing substantially as indicated by the line and arrows 2—2 of Fig. 1.

Fig. 3 is an enlarged sectional view substantially as indicated by the line and arrows 3—3 of Fig. 2.

Figure 1:
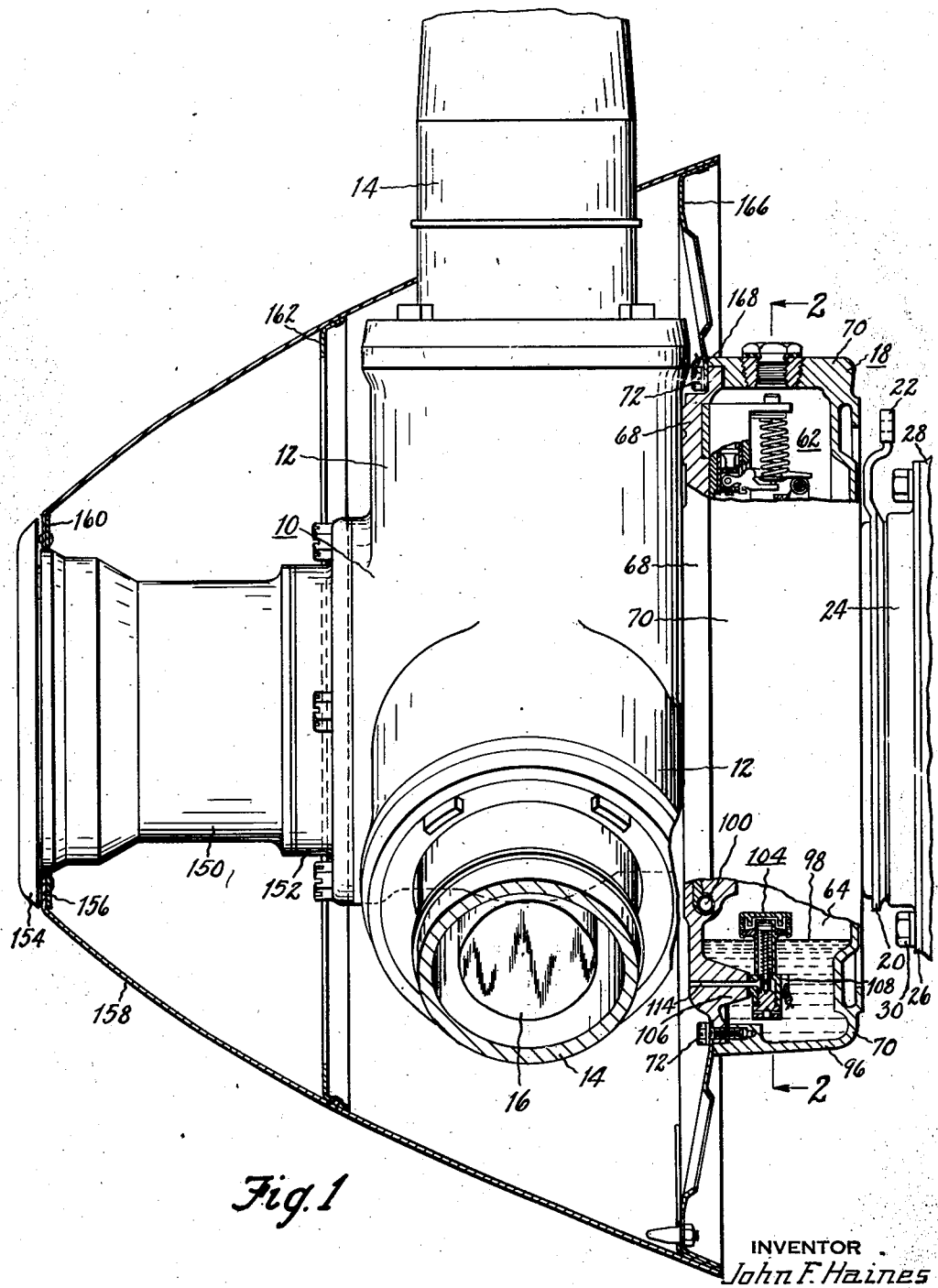
Fig. 1 is a view in side elevation of an automatically controlled propeller mechanism with certain parts shown in section, illustrating the condition and relation of certain parts while the propeller is in a state of rotation.

Figs. 4 and 5, are detailed views in section, substantially as indicated by the lines and arrows 4—4 and 5—5 respectively of Fig. 3.

In propeller constructions of the variable pitch type that are controlled by a hydraulic fluid, and particularly those in which the hydraulic fluid is enclosed in a regulator housing that rotates with the propeller, the enclosed fluid may be subjected to considerable agitation or churning, part of which may be due to changes in speed of propeller rotation, and part of which may be due to operation of the control units, such as pumps, relief valves, hydraulic torque units, and the like especially where there is discharge of liquid from an orifice. In constructions of that kind, it is preferable that the reservoir have a certain amount of void space, or on the other hand a substantial quantity of void space may unintentionally exist. That is, the reservoir may be filled with fluid and air in definite proportions. Whenever that condition does obtain, the space within the reservoir not occupied by the hydraulic fluid may be made up of an atmosphere containing a physical mixture of air and particles of the hydraulic fluid. Thus the void space consists of what may be called a fog, and indeed certain portions of the void space or of the hydraulic fluid may be otherwise aerated. All of this tends to produce a gaseous content of the reservoir that is other than pure air.

Another condition to be taken into consideration is the fact that an aircraft so fitted with a rotating reservoir will be subjected to great variations of external pressure as the craft climbs from ground level to high altitudes and descends to ground level again. The pressures aloft decreasing rapidly tend to increase the pressure differential as the aircraft gains altitude.

In consequence of that the greater pressure within the reservoir tends to force the hydraulic fluid out through any cracks or seams, or meeting surfaces between bearings or other relatively moving parts, making for a substantial loss of hydraulic fluid, and perhaps failure of operation of the control mechanism. Also, the accuracy of control by the hydraulic mechanism is materially reduced. The loss of medium may occur despite the closeness of fit, or engagement of the parts, and bearing seals may not correct the condition.

The churning of the hydraulic fluid by discharge from an orifice, such as the distributor valve and pressure relief valve, and by the meshing of pump and other gears, individually or collectively may cause some aeration of the hydraulic fluid. There may be definite strata of air, fluid and a mixture of the two. In relieving the greater pressure of the mixture within the reservoir, or in venting it to outside air directly, there will be a consequent loss of a considerable portion of the fluid, unless the constituents of the mixture are first separated.

With particular reference to the drawings, 10 refers to a propeller hub of the variable pitch type, in which there radiates therefrom blade sockets 12 rotatably supporting blades 14 adapted to be shifted by a hydraulic torque unit 16 in response to control effected by a regulator mechanism 18. The regulator mechanism is mounted at the rear of the hub 10 in close association therewith so as to be driven thereby. A control ring 20 is associated with the mechanism for effecting a manual control through the agency of linkage from the pilot's compartment to a lug 22. The control ring constitutes one element of an adapter assembly, including a bearing ring 24 having a flange 26 fixed to the engine nose or gear-casing 28 by means of screw devices 30.

The bearing ring 24 is channeled to receive a guide ring 32 which together forms a channel 34 within which the control ring is rotatable. Projecting through the bearing ring 24 and guide ring 32, a plurality of screw devices 36 thread into a thickened portion 38 of a sleeve 40 and when so secured constitute the adapter assembly which is maintained in relatively fixed relation with respect to the engine nose or gear casing 28. In the finally assembled form, that is, when the mechanism with its regulator is mounted upon the propeller shaft, the sleeve 40 of the adapter assembly extends into the housing of the regulator mechanism 18 and provides a flange 42 having gear teeth engageable with a pump gear 44 for operating a pump 46. Mounted on the sleeve 40 so as to be slidable lengthwise thereof is a slide ring 48 guided in movement along the sleeve by keys 50, the slide ring being movable through the agency of screw shafts 52 journalled in the thicker portion 38 of the sleeve and having a pinion in engagement with the teeth 54 of the control ring 20.

The slide ring 48 provides a groove 56 in which rides a shoe member 58 on a movable fulcrum 60 carried by a governor mechanism 62.

The adapter assembly so far as the sleeve 40 is concerned, though fixed against rotation, forms the inner boundary of a reservoir 64 about which rotates the regulator mechanism 18. The regulator mechanism constitutes the pump 46, the governor valve 62 with other mechanisms such as a relief valve 66 rigidly mounted with respect to one another within the reservoir 64, and in the specific instance are supported by a plate member 68 joined in sealing relation to a cover member 70 through the agency of screw devices 72 and seals 74 and 76. For supporting the seal 74 the plate member 68 provides a circular ledge 78 within which is secured a flange ring 80, and the cover member 70 provides a ledge 82 within which is secured the oil seal 76.

The seals 74 and 76 are essentially the same in construction except for diameter and both provide a channel ring 84 to one leg of which is secured a soft flexible sealing strip 86 of rubber or the like, the strip having a thin wedge shaped deflected flange 88 adapted to bear upon a bearing surface 90, or 92 provided by the sleeve 40. An angular backing strip 93 is spaced from the opposite flange of the channel member 84 by means of a suitable spacer 94. Thus when the regulator housing is assembled with the seals 74 and 76 and the sleeve 40 of the adapter assembly, there is provided the annular chamber 64 surrounding the sleeve 40 and normally closed against outside communication. The inherent resiliency of the wedge shape portions 88 of the seals, backed up by the spring members 93, maintain the sliding contact between the rotating part of the regulator and the sleeve 40, which wedge portions are under sufficient pressure while the mechanism is standing at rest to prevent any consequent leakage of hydraulic fluid from between their contacting surfaces.

In a condition of rest, the hydraulic fluid seeks a level somewhat above the horizontal diameter through the axis of rotation 0, such that, ordinarily, there would be some leakage past the contacting surfaces of the sleeve and seal were it not for the inherent properties of the seal. Under a condition of operation, the regulator housing rotates with and at the same speed as the propeller, in consequence of which the hydraulic fluid is thrown outwardly from the axis of rotation against the peripheral wall 96 of the cover member 70 somewhat as illustrated by the numeral 98 in Fig. 1 which is indicative of the fluid surface within the reservoir while the apparatus is under a condition of rotation. The liquid and air of the reservoir charge are thus somewhat stratified. Under a condition of operation, the pump mechanism 46 driven by the stationary element 42 draws the hydraulic fluid from the chamber 64 and introduces it under pressure into a passage 100 leading to a governor mechanism 62 by way of a relief valve 66, which governor mechanism operates under the demand of conditions necessitating change of blade pitch, and distributes the built up pressure to one or more distributing lines 102 communicating directly with the torque units 16. However, that automatic control mechanism has been elsewhere described in a copending case, now 2,307,102, to Blanchard et al., and other mechanisms similar in function have been described in patent literature and are well known to those experienced in the art, therefore, requiring no further description herein.

While the mechanism is operating, the propeller with its attached regulator mechanism is rotating at a constant speed about the stationary element 42, and the hydraulic fluid contained within the chamber 64 will, while lying against the peripheral wall of the cover member also rotate at the said constant speed. When that condition arises, there is a consequent agitation of the hydraulic fluid by the pump mechanism 46, the relief valve 66, and the governor mechanism 62, and all of which tends to set up a turbulence of the hydraulic fluid effecting some aeration of the same. With particular reference to Fig. 1 the content of the chamber 64 below the level 98 consists of the hydraulic fluid, while that above the level 98 or at least the stratum immediately adjacent may be a mixture of air and particles of the hydraulic fluid.

As a means for minimizing the pressure differential between the interior and exterior of the regulator housing, and for separating the particles of the hydraulic fluid from the air content of the chamber 64, there is provided the separator and valve unit 104 which is mounted upon a boss 106 provided by the plate member 68 where it is secured by screw devices 108. The unit 104 comprises a tubular member 110 having a cross-channel 112 adapted, when mounted upon the boss 106, to line up with the passage 114 in the plate 68 forming an outlet to outside air. The unit is so mounted as to project radially inward toward the axis of rotation where it ends in a head member 116 providing a port 118, that end being surrounded by a flange 120 supporting a capped member 122 having a pair of concentric flanges 124 and 126 disposed over, but spaced from, the head member 116 of the tube. The outer flange 124 makes secured engagement with the flange 120 and is provided with a plurality of circular apertures 128 and 130 arranged in two circular rows, and in front of the other. The flange 120 is wedge shaped in cross section so as to provide an inclined surface 132 sloping from the tube outwardly toward the periphery of the flange and so as to meet the outer rim 124 adjacent the apertures 130. Within the tube 110 there is a spring pressed plunger 134 carrying a valve 136 normally seated against the head 116 to close the port 118 by means of a coil spring 138 seated against a guide nut 140 closing the opposite end of the tube 110, such as at 142.

With this device in place the cap member 122 over the end of the tubular member 110 provides a labyrinth or set of baffles through which the gaseous mixture within the chamber 64 must pass in relieving the pressure within the reservoir. Continuing to assume that the apparatus is in a state of rotation, centrifugal force will operate to move the valve 136 away from the head members 116, thereby permitting any difference of pressure in and out of the reservoir to be equalized. As an example, the mixture of liquid and air in the chamber 64, especially when the pressure there is greater than that outside the reservoir, may pass inward through the row of ports 128 to the space about the flange 126, thence toward the flange 120 where it recurves and flows around the flange 126 and over the end of the head member 116 and through the port 118 to the chamber within the tube 110, from which it passes out through 112 and 114 to atmosphere. While doing so the vapor passing through the labyrinth is centrifugated against the inside surface of the flange 120 where the incline 132 causes the heavier liquid particles to flow out of the port 130 and be returned to the reservoir 64. Thus the mixture of air and hydraulic fluid within the chamber 64 is substantially separated into air which flows out through the passages to atmosphere and into liquid of heavier content, that is returned to the reservoir.

While the propeller mechanism is in operation, centrifugal force acting upon the valve 136 will keep the same open while the aircraft is moving from ground level to high altitude, and vice versa, wherefore the passages are kept open for equalization for pressure within and without the reservoir during substantially all conditions of operation. But when the apparatus is brought to rest, the valve 136 is closed under the force of the spring 138 which prevents loss of hydraulic fluid through those breather passages. Not only is the loss of hydraulic fluid prevented, but failure of successful operation of the control mechanism for want of sufficient hydraulic fluid is eliminated.

The valve 134 also acts as a safety valve to prevent damage to the regulator due to pressure while stationary or running below operating speed. If the gaseous content of the chamber 64 increases in pressure for any reason, while the mechanism is at rest, that pressure exerting itself through the passages 128, the passages between the baffles and the port 118 will raise the valve head 136 and relieve the pressure to the outside through the ducts 112 and 114.

The complete installation of the propeller and control mechanism may incorporate the addition of a spinner for fairing or stream-lining the roughened portions of the propeller and hub assembly. In the disclosed embodiment, that is accomplished by means of a spinner adapter 150 secured to a terminating flange 152 of the hub 10 in any desired manner. As shown, the spinner adapter mates with a nose ring 154 engaging a flange 156 of the spinner 158, reinforced by a ring 160. At an intermediate point of the length of the spinner, a reinforcing hoop 162 is secured, and the base end of the spinner may be secured to a supporting plate 166, whose inner periphery 168 is secured beneath the screw devices 72 uniting the regulator plate 68 and cover 70.

While the embodiment of the present invention as herein disclosed, constitutes a preferred form, it is to be understood that other forms might be adopted, all coming within the scope of the claims which follow.

I claim:

1. In an hydraulic apparatus having a rotatable reservoir partially filled with a liquid medium subject to aeration, the combination with said reservoir of a deaerating unit comprising a tubular casing having an apertured head, valve means in the casing adapted to open and close the aperture of said head, yielding means normally urging the valve means in aperture closing relation, means mounting the tubular casing substantially coincident with a radius from the axis of reservoir rotation, and providing constant communication between the tubular casing and the exterior of the reservoir, and means surrounding the head of the tubular casing and providing a tortuous passage between the reservoir and the aperture of said head, the valve and yielding means of said unit responding to a predetermined speed of reservoir rotation for opening free fluid communication between the interior and exterior of said reservoir and the tortuous passage operating to separate the aerated medium into its principal constituents and return the liquid particles thereof to the reservoir.

2. In a propeller control mechanism for a hydraulically controllable constant speed propeller of the character described having a housing rotatable with the propeller shaft, the combination including, a reservoir in said housing for receiving a quantity of pressure actuating fluid, means operating upon said fluid in response to rotation of said propeller for effecting control of the speed of propeller rotation, said means having intake and return ports to said reservoir and means minimizing loss of the actuating fluid from the reservoir, including liquid sealing means normally closed against relief of greater pressure within the reservoir to a lesser pressure without but adapted to communicate a greater external pressure to the interior of the reservoir, said means operating to prevent loss of liquid from the reservoir by seepage while the propeller is at rest, fluid pressure equalizing means normally closed while the propeller is at rest and adapted to open at a predetermined speed of propeller rotation for preventing fluid movement outward from within the reservoir while the propeller is at rest and while rotating at speeds less than said predetermined speed, and for effecting free fluid connection between the reservoir and the outside air during propeller rotation at speeds greater than said predetermined speed, and means associated with said pressure equalizing means and operable upon fluid movement outward from said reservoir to separate liquid particles from the outward moving fluid and return the said particles to the reservoir.

3. A self contained propeller control mechanism for a constant speed hydraulically controllabe propeller having fluid actuated means for effecting change in the pitch of its blades and adapted to maintain a high degree of accuracy of speed regulation, comprising a propeller hub, a housing mounted upon the propeller hub and rotatable therewith, a stationary member projecting into said housing, fluid seal means for maintaining a fluid sealed connection between said housing and said stationary member, and responding to relative increase of air pressure outside of the housing over pressure within for reducing the differential of pressure between the interior and exterior of the housing, said housing providing a reservoir, a quantity of liquid pressure actuating medium and air in a predetermined ratio by volume being contained in the reservoir, said reservoir operating while rotating to stratify the liquid medium radially outward of the air, said fluid actuated means having an intake from said liquid stratum and discharging back into said reservoir, means carried by the housing and providing a port exposed to the air stratum within the reservoir for opening a passage to the exterior thereof, means normally closing said port and responding to a predetermined speed of propeller rotation to open said port for venting said reservoir to outside air, and means associated with said port adapted to centrifugate escaping mixture of air and liquid, and return the separated liquid to the reservoir, whereby the predetermined quantity of liquid medium is maintained without loss sufficient to effect the accuracy of blade pitch control.

4. A propeller control mechanism of the character described for use with a controllable blade propeller having fluid actuated means for effecting change in the pitch of the blades comprising a sealed housing rotatable with said propeller and containing a quantity of operating liquid, means within said housing for subjecting said liquid to pressure, and discharging into said housing, a breather valve body mounted for rotation with said propeller and a valve plunger in the body directly responsive to centrifugal force for opening the housing to outside air, resilient means acting with a substantially constant force irrespective of the speed of said propeller for opposing the action of centrifugal force on said valve plunger, said breather valve and resilient means operating to maintain the internal and exterior pressure of the housing within a predetermined differential, and means incorporated in the breather valve body to separate any operating liquid from the air escaping from the housing.

5. In a pressure fluid actuated controllable blade propeller having a propeller hub, a housing adapted to be rotated with the propeller hub, fluid sealing means for sealing said housing while at rest and providing a self contained reservoir for receiving a quantity of pressure actuating liquid that partially fills the reservoir, and fluid actuated means having intake and discharge openings to said reservoir, and tending to aerate discharged liquid, the combination of means including a valve unit responding to a predetermined speed of propeller rotation for effecting fluid communication from the reservoir to the outside air and a baffle in the path of said communication for separating the aerated liquid into its constituents, said valve unit discharging the separated air to the outside of the reservoir and returning the separated liquid to the reservoir.

6. A propeller control mechanism of the character described for use with a controllable blade propeller having liquid actuated means for effecting change in the pitch of the blades comprising a propeller hub, a housing rotatable with the propeller hub, a relatively stationary member projecting into said housing, means for establishing a liquid seal between said housing and said stationary member providing a sealed reservoir within said housing for receiving a quantity of liquid pressure medium, hydraulic apparatus having an intake means from and a discharge means into said reservoir, and means for limiting differentials of pressure between the interior and exterior of said reservoir to prevent leakage of said liquid pressure medium from the reservoir and means operable upon occurrence of fluid flow from within the reservoir while rotating to separate the liquid pressure medium into its liquid and gaseous constituents.

7. A propeller control mechanism of the character described for use with a controllable blade propeller having liquid actuated means for effecting change in the pitch of the blades comprising a propeller hub, a housing rotatable with the propeller hub, a relatively stationary member projecting into said housing, means for establishing a liquid seal between said housing and said stationary member providing a sealed reservoir within said housing for receiving a quantity of liquid pressure medium, hydraulic apparatus having an intake means from and a discharge means into said reservoir, and means subjected to the areated liquid medium discharged into the reservoir for separating the same into its air and liquid constituents and for returning the liquid to the reservoir and means for discharging the air to the outside of the reservoir.

8. A propeller control mechanism of the character described for use with a controllable blade propeller having fluid actuated means for effecting change in the pitch of the blades, comprising a propeller hub, a housing rotatable with the propeller hub, a relatively stationary member extending into said housing, and forming a sealed self-contained reservoir for operating liquid partially filling the same, liquid actuated control means discharging into said reservoir, and a centrifugally operated valve unit for maintaining the air pressure inside of the reservoir within a predetermined differential of the outside pressure, and means for separating any operating liquid from the air that is to be discharged to the outside of the reservoir.

9. In a hydraulic control apparatus having a rotatable reservoir charged with predetermined quantities of operating liquid and air, and subject to differentials between external and internal pressure, the combination of pressure equalizing means for causing the pressure changes within the reservoir to closely follow the gradient of the external pressures, comprising, a valve unit carried by the reservoir and having a port and passage for connecting the interior and exterior of the reservoir, centrifugally operated means normally closing said port while the reservoir is rotating at a speed less than that required to stratify the charge of liquid and air, but operating at a predetermined speed of reservoir rotation to open said port, said port when open permitting the equalization of pressures within and without the reservoir.

10. In a hydraulic control apparatus having a rotatable reservoir charged with predetermined quantities of operating liquid and air, and subject to change in external pressure, the combination of pressure equalizing means for causing the pressure changes within the reservoir to closely follow the gradient of the external pressures, comprising, a valve unit carried by the reservoir and having a port and passage for connecting the interior and exterior of the reservoir, centrifugally operated means normally closing said port while the reservoir is rotating at a speed less than that required to stratify the charge of liquid and air, but operating at a predetermined speed of reservoir rotation to open said port, said port when open permitting the equalization of pressures within and without the reservoir, and a set of baffles in the outbound fluid circuit and anterior to said port for separating liquid particles from the escaping fluid and returning said particles to the reservoir.

11. The combination set forth in claim 10 wherein said valve unit comprises a tubular casing mounted within the reservoir so as to extend radially with respect to the axis of reservoir rotation, means making fluid connection between the bore of the tubular casing and the exterior of the reservoir, a valve port at the radially inner end of said tubular casing, and said centrifugally operated means comprising a spring pressed plunger enclosed by the casing and normally closing said port.

12. The combination set forth in claim 10 wherein said baffles comprise a cap member inverted over and spaced from said port and providing concentric flanges the outermost of which is secured to a supporting plate at its rim, said outermost flange having a series of apertures therethrough arranged in two planes substantially tangent to the arc of rotation, those of one plane providing fluid inlets to said cap, and those of the other plane providing liquid outlets therefrom into said reservoir.

13. In a device of the character described, a pressure equalizing unit comprising in combination, a chambered body having a tubular extension, means for mounting the body so that the tubular extension substantially coincides with a radius from an axis about which the body revolves, a head at the end of the tubular extension having a port therethrough, yieldable means normally closing said port, and responding to a predetermined speed of rotative movement to open fluid passage therethrough, and a set of baffles surrounding said ported head.

14. In apparatus of the class described, the combination comprising, means providing a reservoir partially filled with a liquid medium, means causing the liquid medium to move in a circular path about a center of rotation and to be stratified outwardly of a central mass of air, a pressure equalizing unit carried by the moving means having a ported head exposed to said air mass, and having a passage leading to the exterior of the reservoir, and a spring urged valve normally closing said port and responsive to a predetermined speed of rotation of the moving means for opening said port, said unit maintaining the reservoir closed against leakage of liquid medium while liquid is at rest, and operating to open fluid flow between the reservoir and outside air when the liquid moves at a speed greater than a predetermined speed, whereby pressure in and outside of the reservoir are substantially equalized.

15. The combination set forth in claim 14 wherein, a tortuous passage is provided between the central air mass and the ported head, so that outward relief of excess pressure from the reservoir will effect separation of liquid particles and return of the same to the liquid stratum.

JOHN F. HAINES.